UNITED STATES PATENT OFFICE.

CARLETON ELLIS, OF MONTCLAIR, NEW JERSEY, ASSIGNOR TO NEW JERSEY TESTING LABORATORIES, A CORPORATION OF NEW JERSEY.

FLAME-PROOF INSULATION.

1,246,810. Specification of Letters Patent. Patented Nov. 13, 1917.

No Drawing. Application filed July 2, 1917. Serial No. 178,283.

*To all whom it may concern:*

Be it known that I, CARLETON ELLIS, a citizen of the United States, and a resident of Montclair, in the county of Essex and State of New Jersey, have invented certain new and useful Improvements in Flame-Proof Insulations, of which the following is a specification.

The present invention relates to an improvement in what may be termed "flame proof insulation" and particularly to the use of chlorinated material of an organic nature, particularly chlorinated wax.

The composition described herein may be used with a conductor consisting of a copper wire having an insulating layer of rubber or other suitable material, and a coating of textile material, such as braided cotton surrounding and protecting the insulating layer. The fabric may in some cases be saturated with an ordinary wax or asphalt or bodies of a similar nature, which when ignited will burn with considerable readiness, thereby causing the flame to travel along the wire, whereby oftentimes considerable damage is done.

In accordance with the present invention, I employ, either with or without the layer of rubber and cotton or like material as above referred to, a chlorinated wax, which may be employed alone, or mixed with other materials. One way of employing the chlorinated wax, is to pass the rubber-coated, cotton-jacketed wire through a bath of the molten chlorinated wax, whereby a considerable amount of such chlorinated wax may be absorbed or taken up by the cotton, which material upon hardening produces a somewhat resin-like material, that is to say a material having approximately the physical characteristics of resin, although the material may be less brittle and more plastic than resin. The insulating wire carrying a coating of rubber and a jacket of cotton, if ignited, for example by holding the wire in a lamp flame, the fire will travel along the wire. I preferably employ the flame proof insulating material, in such an amount as will prevent the spread or propagation of the flame along the length of the wire.

In selecting the chlorinated material, a material should be employed which will not injure the fabric or the rubber insulation, and particularly materials should be used, which will not cause the rubber to become brittle or to rot. The material also should not be such as to cause the rubber to soften or to dissolve.

In the embodiment of the invention forming the subject matter of the present application, I preferably chlorinate waxes, using iodin or similar carrier, to act as a catalyst in the chlorination. The waxes employed may be chlorinated in a molten condition, or dissolved in suitable solvents, such as benzol, toluol, xylol or the like.

As examples of the treatment of waxes, I call attention to the treatment of paraffin wax, ceresin wax, Japan wax, or other waxy bodies, and the amount of chlorin absorbed should preferably be over 10%, and in many cases an amount of chlorin equal to the weight of the waxy material under treatment may be taken up.

Petroleum residua containing waxy materials, such as paraffin wax may be employed if desired. A single waxy body alone may be chlorinated, or mixtures of waxy bodies, or mixtures of waxes with petroleum oils, asphalts, pitches, malthas, fats, tars including wood tar, and similar materials.

After the chlorination has proceeded to the desired extent, it is advisable to remove free acids, such as hydrochloric acid, for which purpose the product may be washed with dilute alkali, or boiled with sodium carbonate solution, and in some cases also it may be heated with an alkali such as milk of lime under pressure, to completely eliminate the hydrochloric acid.

The chlorinated wax material may be used alone, or may be mixed with other materials, such as chlorinated bodies, among which I mention chlorinated mineral petroleum oils, as described and claimed in my copending application, 41,924, or chlorinated tar or chlorinated tar fractions, as described and claimed in my copending application, 43,743, or with chlorinated naphthalene, chlorinated fish oil, inorganic fireproofing agents, tungstates and phosphates of ammonia and the like, although the latter are sometimes objectionable as being water-soluble and hence as lowering the resistance of the insulating wires to moisture. Other materials which may be added are petroleum oils, asphalts, pitches, malthas, fats, petroleum residuums, wood tar, resins including ordinary rosin, any of which can if desired also be chlorinated, or can be employed without chlorination.

What I claim is:—

1. An insulating composition comprising plastic insulating material containing chlorinated wax of a substantially non-inflammable character; sufficient of such chlorinated wax being present to render the composition substantially flameproof; said composition being sufficiently plastic to be adapted for use for the coating of wire.

2. An insulating composition adapted for use in the coating of wire comprising a chlorinated mineral wax of a non-inflammable character; sufficient of the latter being present to render the composition substantially flameproof.

3. An insulating composition adapted for use in the coating of wire comprising combustible insulating material incorporated with chlorinated derivatives of paraffin wax; the proportion of the latter being sufficient to reduce the inflammability to an extent such that if ignited at any given spot, the flame does not travel along the surface of the composition for any substantial distance but is extinguished by the presence of the chlorinated constituent.

4. An insulating composition comprising as its essential ingredient, a normally waxy body chlorinated to a chlorin content of at least 10%, said material being substantially incombustible.

5. An insulating composition comprising combustible insulating material associated with a resin-like chlorinated wax.

CARLETON ELLIS.